(12) United States Patent
Zarelius

(10) Patent No.: US 9,069,239 B2
(45) Date of Patent: Jun. 30, 2015

(54) COLLAPSIBLE DISPLAY MEANS

(75) Inventor: Christer Zarelius, Stockholm (SE)

(73) Assignee: EXPAND INTERNATIONAL AB, Johanneshov (SE)

( * ) Notice: Subject to any disclaimer, the term of this patent is extended or adjusted under 35 U.S.C. 154(b) by 0 days.

(21) Appl. No.: 14/000,411

(22) PCT Filed: Feb. 8, 2012

(86) PCT No.: PCT/SE2012/050117
§ 371 (c)(1),
(2), (4) Date: Aug. 20, 2013

(87) PCT Pub. No.: WO2012/115566
PCT Pub. Date: Aug. 30, 2012

(65) Prior Publication Data
US 2013/0329287 A1   Dec. 12, 2013

Related U.S. Application Data

(60) Provisional application No. 61/447,536, filed on Feb. 28, 2011.

(30) Foreign Application Priority Data

Feb. 25, 2011   (SE) ...................................... 1100132

(51) Int. Cl.
G09F 15/00 (2006.01)
G03B 21/30 (2006.01)
(52) U.S. Cl.
CPC ............ *G03B 21/30* (2013.01); *G09F 15/0062* (2013.01); *G09F 15/0068* (2013.01)

(58) Field of Classification Search
CPC .................................................... G09F 15/0062
USPC .................... 40/610; 160/24, 27, 28
See application file for complete search history.

(56) References Cited

U.S. PATENT DOCUMENTS

| 6,012,688 | A  | * | 1/2000 | LaMotte ........................ 248/165 |
| 7,337,567 | B2 | * | 3/2008 | Fritsche et al. .................. 40/603 |
| 7,530,543 | B1 | * | 5/2009 | Kremzar ..................... 248/441.1 |
| 7,874,090 | B2 | * | 1/2011 | Flagg ............................. 40/605 |

(Continued)

FOREIGN PATENT DOCUMENTS

| DE | 198 50 267 A1 | 12/1999 |
| EP | 2 226 781 A1 | 9/2010 |

(Continued)

*Primary Examiner* — Kristina Junge
(74) *Attorney, Agent, or Firm* — Drinker Biddle & Reath LLP

(57) ABSTRACT

A collapsible display device includes a stand that includes a first part that supports against an underlying supportive surface, and a pole having a first end removably secured in said first part. The display device includes an essentially rectangular screen to be assembled to and disassembled from the display device and a first coupling arranged at a second end of said pole to cooperate with a second coupling arranged at a first short end of said screen. The first part includes at least one first fastener arranged at a shorter distance to the supportive surface than an at least one projector. The screen includes at least one second fastener arranged at a second short end to magnetically fasten to the at least one first fastener, a first magnetic strip arranged in connection with a first longitudinal end, and a second magnetic strip arranged at a second longitudinal end.

11 Claims, 12 Drawing Sheets

(56) References Cited

U.S. PATENT DOCUMENTS

| | | |
|---|---|---|
| 2002/0121034 A1 | 9/2002 | Schmitt |
| 2004/0074123 A1* | 4/2004 | Pritchard .................. 40/610 |
| 2005/0017137 A1 | 1/2005 | Burris |
| 2005/0166430 A1 | 8/2005 | Zarelius |
| 2009/0056184 A1* | 3/2009 | Fritsche et al. ............. 40/604 |
| 2010/0139135 A1 | 6/2010 | Taylor et al. |
| 2012/0216438 A1* | 8/2012 | Harris ....................... 40/604 |

FOREIGN PATENT DOCUMENTS

| | | |
|---|---|---|
| FR | 2 775 107 A1 | 8/1999 |
| KR | 10-0870072 B1 | 11/2008 |
| SE | 469 404 B | 6/1993 |
| SE | 529 576 C2 | 9/2007 |
| WO | WO-99/59121 A1 | 11/1999 |
| WO | WO 0135381 A1 * | 5/2001 |
| WO | WO-2006/086847 A1 | 8/2006 |

* cited by examiner

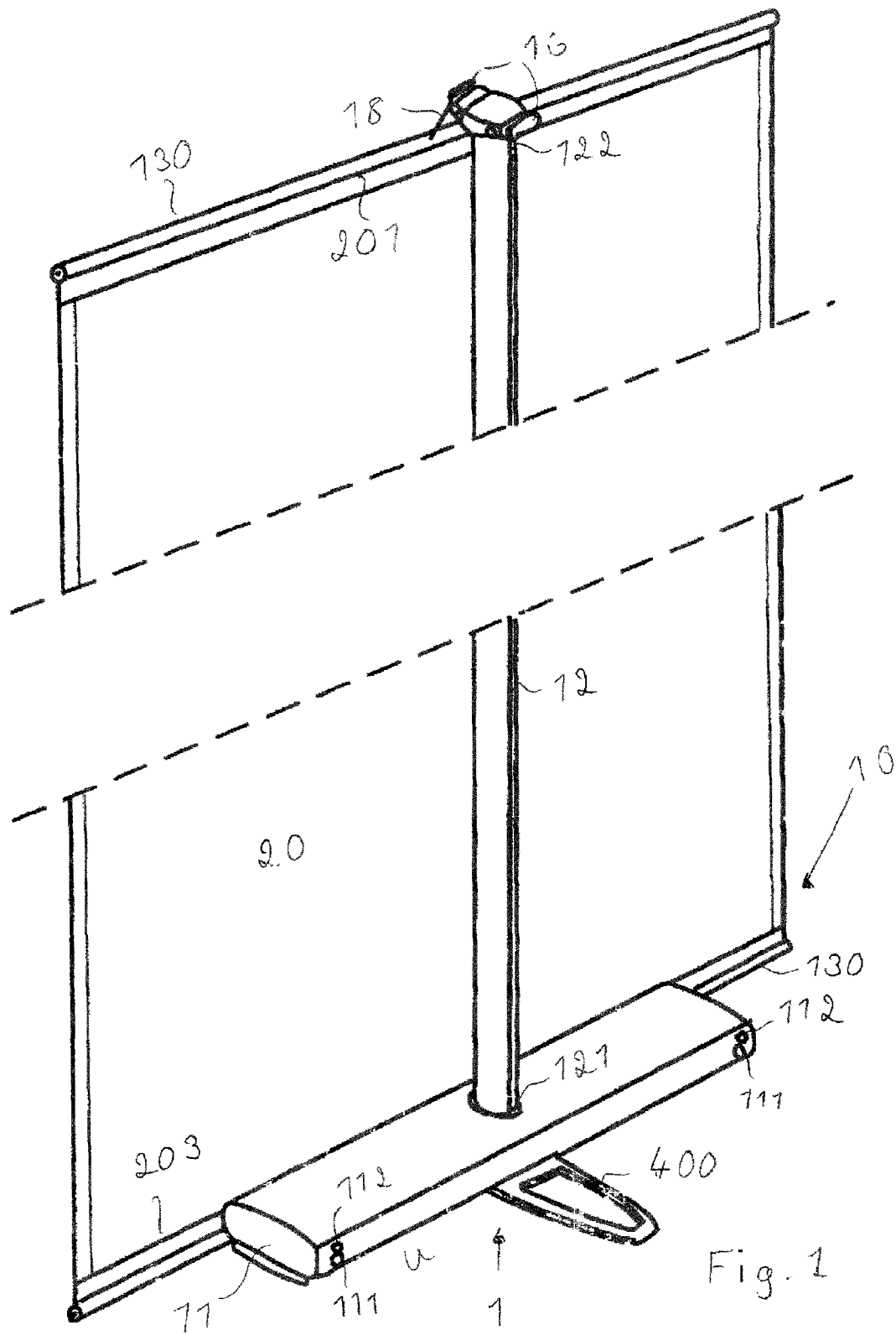

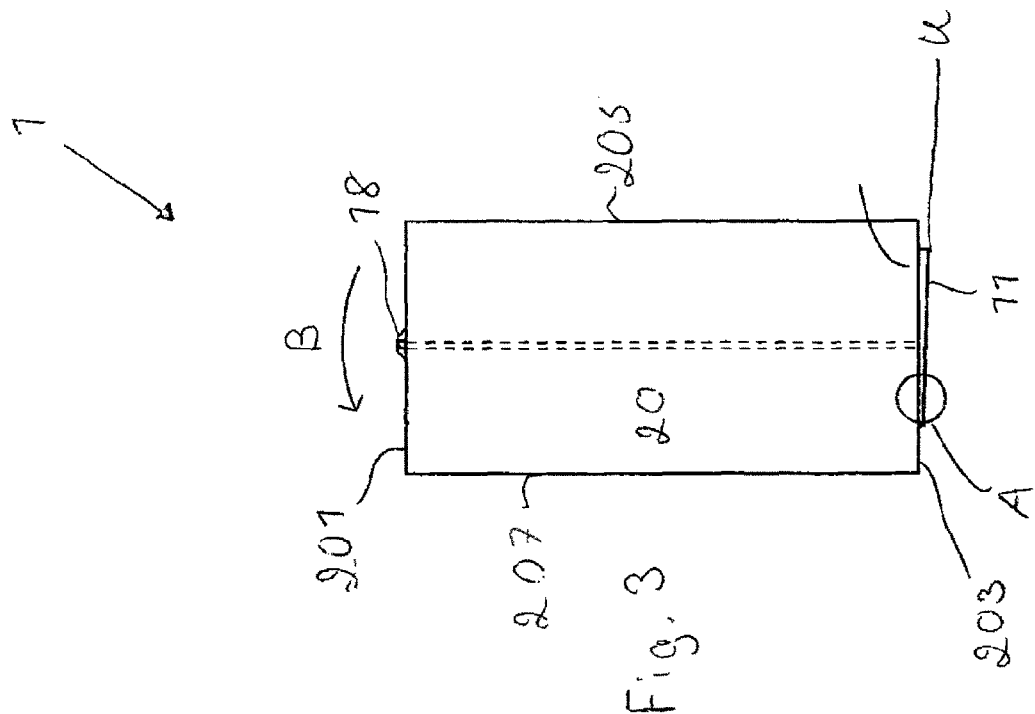
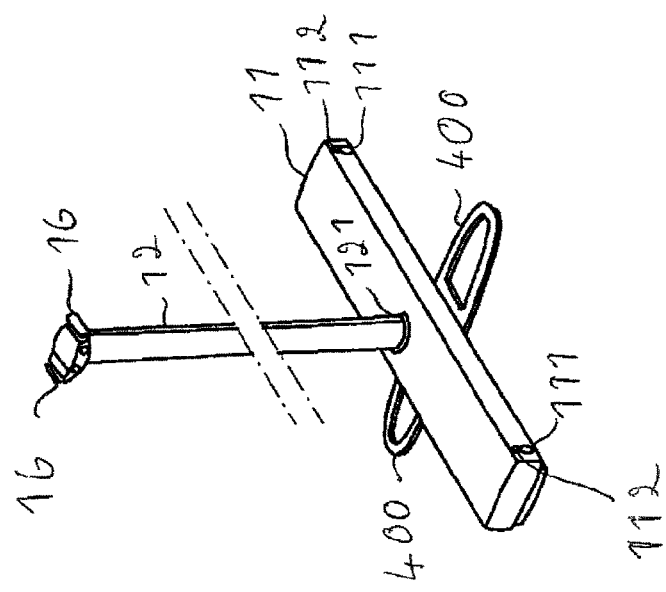

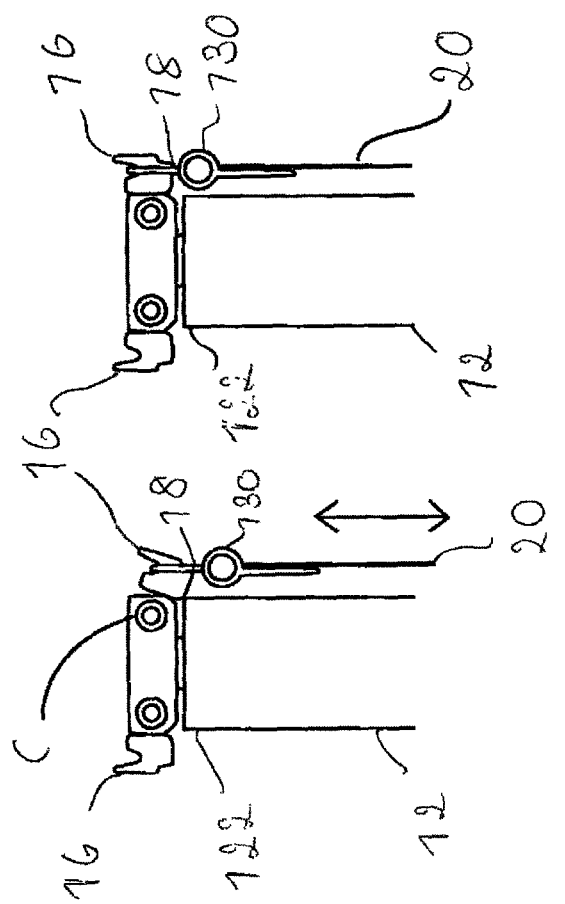

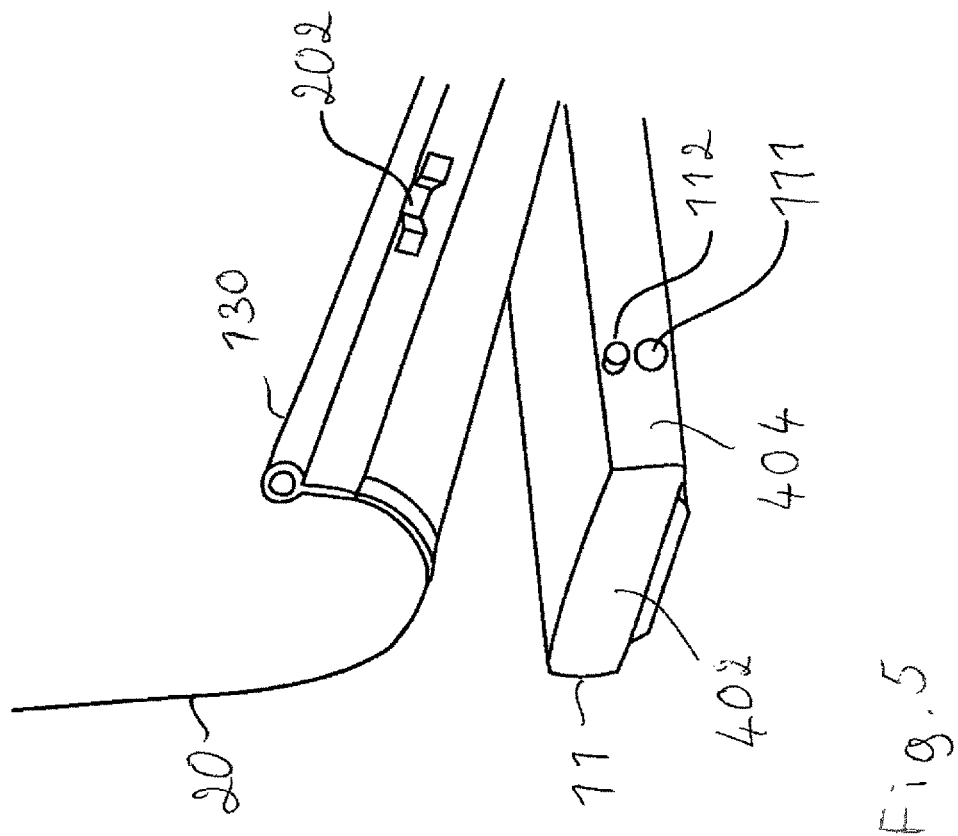

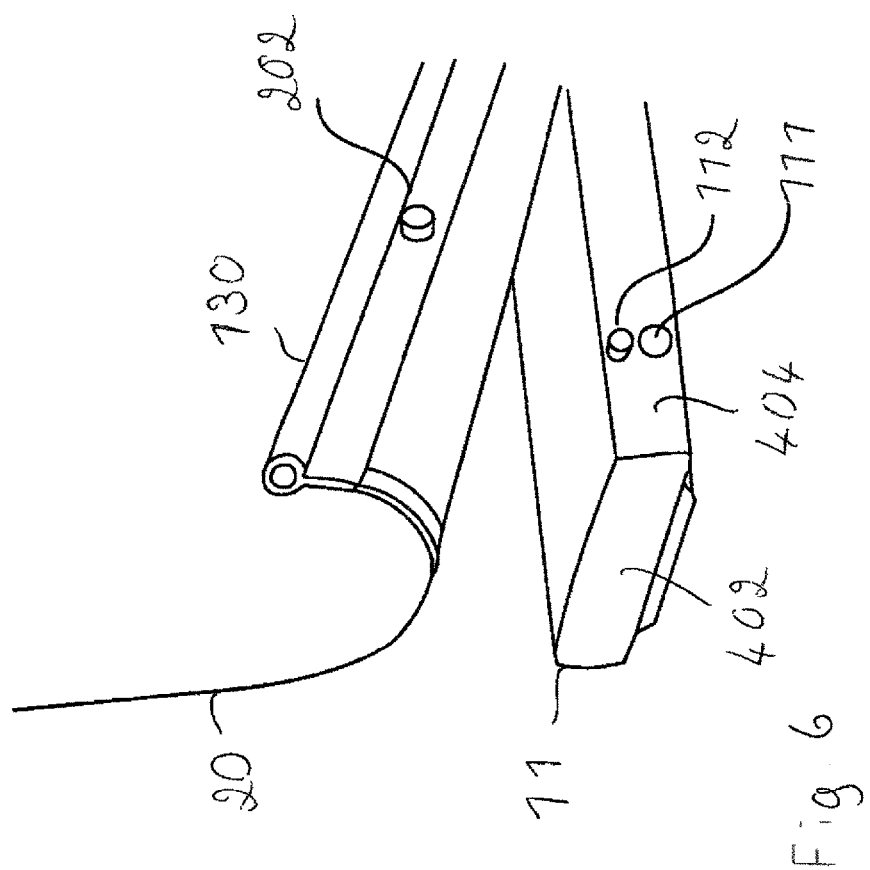

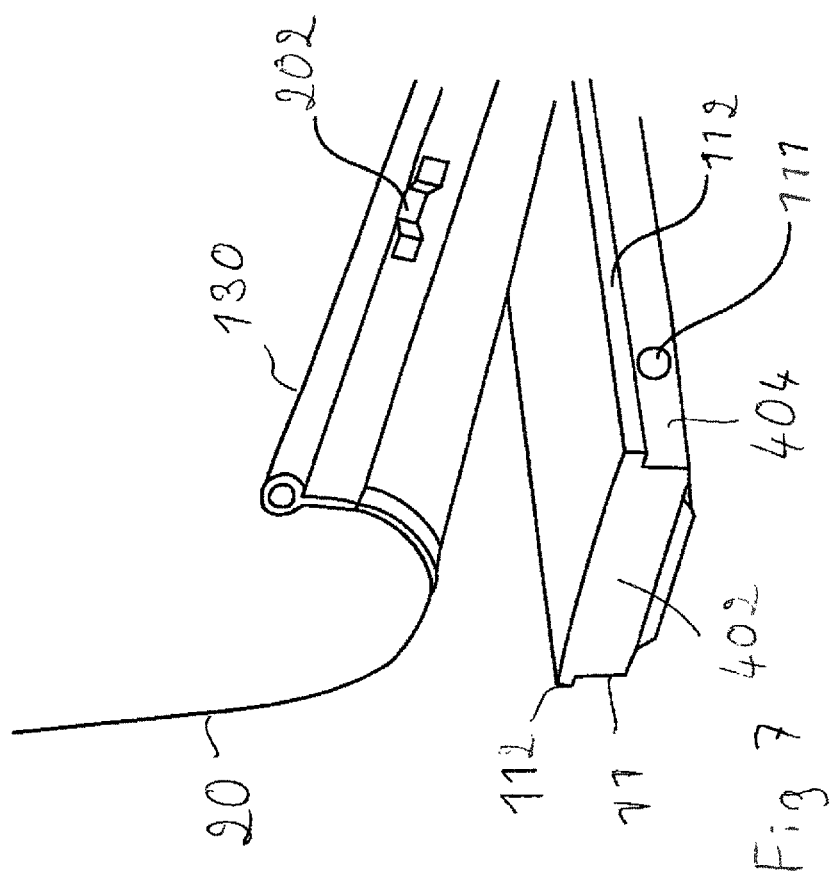

COLLAPSIBLE DISPLAY MEANS

CROSS REFERENCE TO RELATED APPLICATIONS

This application is a §371 National Stage Application of PCT International Application No. PCT/SE2012/050117, filed Feb. 8, 2012, and claims priority under 35 U.S.C. §119 and/or §365 to U.S. Provisional Application No. 61/447,536 filed Feb. 28, 2011 and Swedish Application No. 1100132-8 filed Feb. 25, 2011, each of which are herein incorporated by reference in their entirety.

FIELD OF THE INVENTION

The present invention relates according to a first aspect to a collapsible display means.

According to a second aspect the present invention relates to a collapsible display system.

BACKGROUND OF THE INVENTION

The patent document KR 10-0870072 relates to a stand for attaching a hanging banner, comprising fixing devices and flexible feet, which can be adjusted whenever the stand is standing on an uneven surface. A main disadvantage with this solution is that it is very complicated to produce.

The patent document SE 469 404 relates to a stand for panels comprising lists with magnets for connecting said panels to each other. The panels are supported by a foldable frame.

The patent document US 2005/0166430 A1 relates to a collapsible display arrangement comprising both permanent magnets and magnetic strips in order to connect several display arrangements to, and in line with each other. This solution is not optimized when the floor is uneven.

The patent document DE 198 50 267 A1 relates to a flexible banner stand with means for tensioning the banner.

The patent document EP 2 226 781 A1 relates to an advertising structure using banners which are able to shift and reposition themselves in the presence of wind and telescopic rods affixed to poles. The structure may be single or double sided to hold advertisement banners. It is easily dismantled, and almost fully made in aluminium. The first semi-fixed structure to be positioned onto a pre-existing pole base.

The patent document WO 2006/086847 A1 relates to a portable banner support that supports the banner so as to effect a curving of the banner. The banner support arrangement 1 comprises a pair of metal, ground engaging feet 2 that together create a base 2. The base comprises a collar 4, which is adapted to receive the upright resilient support member 6. The banner 14 is supported at its ends by the upper and lower transverse members 16 such that the banner is in tension between its ends. Each of the transverse members 16 is curved so that the banner follows a curved shape between its sides.

The patent document US 2005/0017137 A1 relates to an adjustable and collapsible display stand that provides improved adaptability to uneven surfaces. Adjustable, flexible connections between strut braces and adjoining struts and a vertical support member allow a user to adjust the angle, load, support and position of the collapsible display for enhanced usage. This display stand is rather complicated to assemble.

The patent document US 2002/0121034 A1 relates to a banner stand 10 (See FIG. 1) for displaying a banner 12 including two feet 16 for maintaining the banner stand 10 in an erect position, a pole assembly 18 for supporting the banner 12, a hanger 20 attached to the back face B (see FIG. 4) of the banner 12 and removably attached to the pole assembly 18, and a base tube 22 to which the banner 12 and the feet 16 attach.

The patent document WO 99/59121 relates to a presentation device 1 comprising a base 5 and bars 3 which can be connected to one another and which are provided for a flexible stand 2, which can be connected to the base 5 via a plug connection. The presentation device 1 also comprises crossbars 9, 10 provided as a holding device for a presentation media 6. The base is configured with four elongated feet 14-17. The feet 14-17 are connected to an elongated transversal support 11 and can swivel from a folded resting position parallel to the transversal support 11 to a functional position in at least essentially perpendicular manner relative to the transversal support 11, and can swivel back again.

The patent document FR 2 775 107 relates to a flexible banner stand with means for tensioning the banner. (See e. g. FIGS. 1-4).

In view of the above mentioned documents there is a need for a collapsible display means which is easy to assemble and provides adaptability to uneven surfaces. Furthermore, there is also a need for a display means which can be connected to each other creating a display system in a flexible way.

SUMMARY OF THE INVENTION

The above mentioned problems are solved with a collapsible display means according to claim 1. The display means comprises a stand comprising a first part which support against an underlying supportive surface. The stand also comprises a pole means, with a first end removably secured in the first part. Furthermore, the display means also comprises an essentially rectangular screen operable to be assembled to and disassembled from the display means, the screen having an image that appears thereon. The display means further comprises a first coupling means arranged at a second end of the pole means, and operable to cooperate with a second coupling means arranged at a first short end of the screen in order to secure the screen resilient. The first part comprises at least one first fastening means, and at least one projection means, wherein the at least one first fastening means is/are arranged at a shorter distance to the surface than the at least one projection means. The screen also comprises at least one second fastening means arranged at a second short end of the screen. The at least one first fastening means, and the at least one second fastening means are operable to magnetically fasten to each other. Furthermore, the screen also comprises a first magnetic strip means arranged in connection with a first longitudinal end of the screen, and a second magnetic strip means arranged at a second longitudinal end of the screen.

A main advantage with this solution is that the screen is able to slide in relation to the first part staying on the floor. This is an advantage if the floor is uneven. Furthermore, the screen will always be stretched even if the floor is uneven. The mounting of the screen gets extremely simple, hang the screen at the top of the pole means, and the different fastening means will force the screen in place.

A further advantage in this context is achieved if the first coupling means is spring biased, forcing the screen away from the surface and making the securing of the screen resilient.

Furthermore, it is an advantage in this context if the pole means is spring biased by an internal spring arranged at the first end, making the securing of the screen resilient.

A further advantage in this context is achieved if the first coupling means is in the form of a hook means.

Furthermore, it is an advantage in this context if the second coupling means is in the form of a loop means.

A further advantage in this context is achieved if each of the first fastening means is in the form of a magnetic means, and if each of the second fastening means is in the form of a projection means of a ferromagnetic material.

According to another alternative, it is an advantage if each of the first fastening means is made of ferromagnetic material, and if each of the second fastening means is in the form of a projection means of a magnetic material.

Furthermore, it is an advantage in this context if each projection means is in the form of a knob means.

According to another alternative, it is an advantage if the projection means is in the form of a projection rim extending along an edge of the first part.

The above mentioned problems are also solved with a collapsible display system according to claim 10. The display system comprises at least two display means according to the present invention. Each two consecutive display means are connected to each other in that the first magnetic strip means of the first display means is attracted to the second magnetic strip means of the second display means.

A main advantage with this solution is that the screens are able to slide in relation to the first parts staying on the floor. This is an advantage if the floor is uneven. Furthermore, the screens will always be stretched even if the floor is uneven.

A further advantage in this context is achieved if each screen also comprises two essentially hollow, straight members of a rigid material, one arranged in connection with the first short end of the screen, and the other arranged in connection with the second short end of the screen, each member comprising a first end part, and a second end part, and if the display system also comprises an essentially rectangular second screen comprising a first magnetic strip means arranged in connection with a first longitudinal end of the second screen, and a second magnetic strip means arranged in connection with a second longitudinal end of the second screen, which also comprises two essentially hollow, bendable members of a flexible material, one arranged in connection with a first short end of the second screen, and the other arranged in connection with a second short end of the second screen, each member comprising a first end part, and a second end part, wherein each end part comprises either a male part, or a female part, at least one of them of a magnetic material, wherein the second screen is connected between two display means by the members being connected to each other, and the magnetic strip means being connected to each other.

Furthermore, it is an advantage in this context if, if an end part of a bendable member comprises a female part, or a male part of a magnetic material, the end part comprises a sleeve means arranged between the end part and the female part, or the male part.

It will be noted that the term "comprises/comprising" as used in this description is intended to denote the presence of a given characteristic, step, or component, without excluding the presence of one or more other characteristics, features, integers, steps, components, or groups thereof.

Embodiments of the invention will now be described with a reference to the accompanying drawings, in which:

BRIEF DESCRIPTION OF THE DRAWINGS

FIG. 1 discloses a perspective view of a collapsible display means according to the present invention;

FIG. 2 discloses a perspective view of some parts of the display means disclosed in FIG. 1;

FIG. 3 discloses a schematic side view of the collapsible display means according to the present invention;

FIG. 4 discloses two side views in more detail of some parts of the display means disclosed in FIG. 1;

FIG. 5 discloses a side view of a part of a first embodiment of the display means disclosed in FIG. 1;

FIG. 6 discloses a side view of a part of a second embodiment of the display means disclosed in FIG. 1;

FIG. 7 discloses a side view of a part of a third embodiment of the display means disclosed in FIG. 1;

DETAILED DESCRIPTION OF PREFERRED EMBODIMENTS

Figure 8:
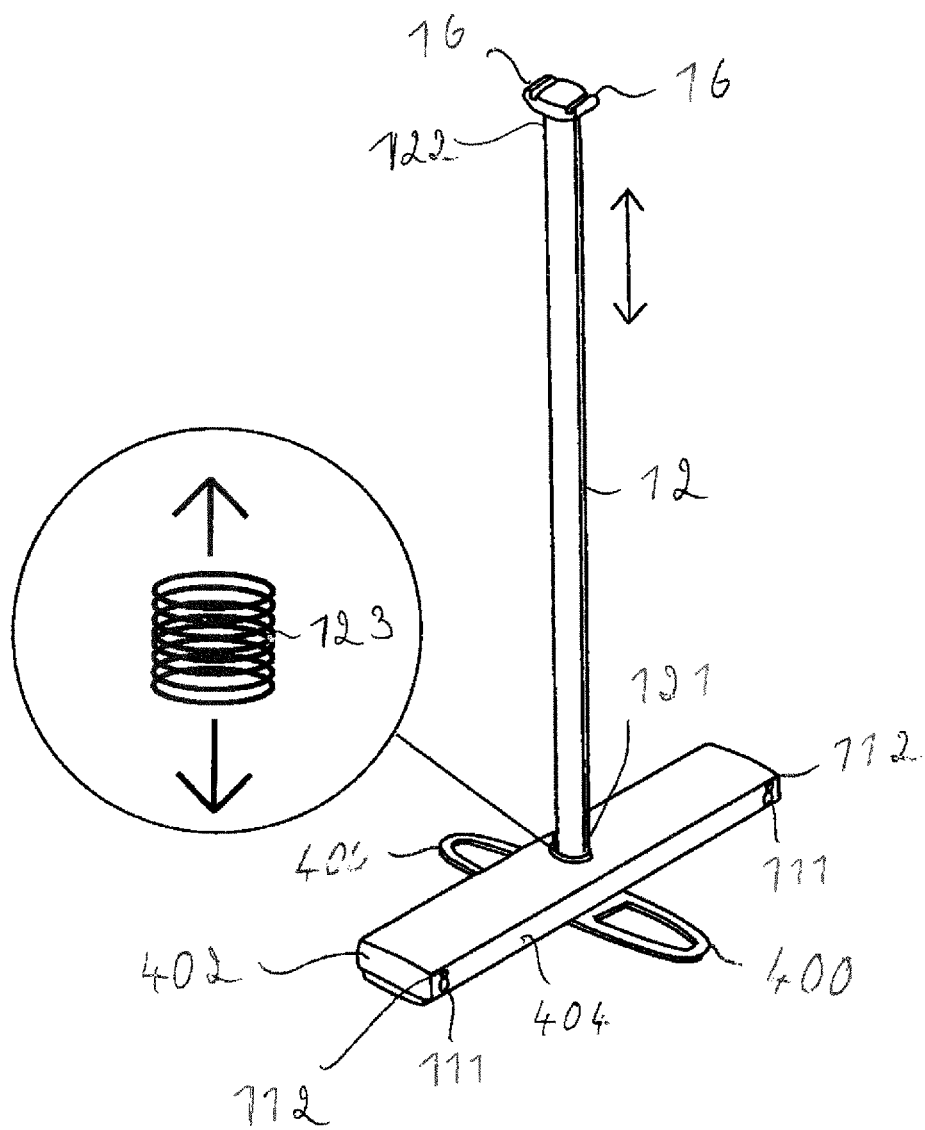
FIG. 8 discloses a perspective view of an alternative solution to the one illustrated in FIG. 2.

In FIG. 1 there is disclosed a perspective view of a collapsible display means 1 according to the present invention. The display means 1 comprises a stand 10 comprising a first part 11 which support against an underlying supportive surface (u). Furthermore, the stand 10 also comprises a pole means 12, with a first end 121 removably secured in the first part 11, and a second end 122. The display means 1 also comprises an essentially rectangular screen 20, which can be assembled to and disassembled from the display means 1, and having an image that appears thereon. In order to increase the stability of the display means 1, the first part 11 is provided with two feet 400, whereof only one is disclosed in FIG. 1. As is apparent in FIG. 1, a first coupling means 16 is arranged at the second end 122 of the pole means 12. Actually, there are two first coupling means 16 disclosed in FIG. 1. The first coupling means 16 is operable to cooperate with a second coupling means 18 arranged at a first short end 201 of the screen 20, in order to secure the screen resilient (see e. g. FIG. 4). As also is apparent in FIG. 1, the first part 11 comprises two first fastening means 111, and two projection means 112. It is pointed out that it is possible with only one first fastening means 111, and only one projection means 112. The screen 20 also comprises, in this case two second fastening means 202 (not disclosed in FIG. 1; see FIGS. 5-7) arranged at a second short end 203 of the screen 20. The first fastening means 111, and the second fastening means 202 are operable to magnetically fasten to each other. Although it is not disclosed in FIG. 1, it is pointed out that it is possible to assemble a second screen 20 on the display means 1. This second screen 20 will be placed parallel to the first screen 20 disclosed in FIG. 1, but with the images facing away from each other. The second screen 20 will consequently make use of the first coupling means 16, the first fastening means 111, the second fastening means 202, and the projection means 112 not used in FIG. 1. Furthermore, there are also disclosed two straight members 130, one arranged in connection with a first short end 201 of the screen 20, and the other arranged in connection with the second short end 203 of the screen 20. The function of these members 130 will be described in FIGS. 11-14.

In FIG. 2, there is disclosed a perspective view of the display means 1 disclosed in FIG. 1, without the screen 20 assembled.

In FIG. 3 there is disclosed a schematic side view of the collapsible display means 1 according to the present invention. In this case the floor (u) is uneven, but the magnetic coupling between the first fastening means 111 and the second fastening means 202 are allowed to slide in relation to each other when the first part 11 is tilted as on an uneven floor (u). This means that the screen 20 will stay almost horizontally. In this figure there are also disclosed a first longitudinal end 205, and a second longitudinal end 207 of the screen 20.

In FIG. 4 there is disclosed two side views in more detail of some parts of the display means 1 disclosed in FIG. 1. In this particular embodiment, the first coupling means 16 is spring biased, forcing the screen 20 away from the surface (u). This is illustrated with C in the left part of FIG. 4. This means that the screen 20 can flex, illustrated with the arrow in FIG. 4. This contributes to the fact that the securing of the screen 20 gets resilient. Furthermore, this figure illustrates that the first coupling means 16 is in the form of a hook means 16.

In FIG. 5 there is disclosed a side view of a first embodiment of the display means 1 according to the present invention. As is apparent in FIG. 5 the first part 11 comprises a short side 402, and a long side 404. In this particular embodiment, the first fastening means 111 is in the form of a magnetic means 111 in line with long side 404. Furthermore, the second fastening means 202 is of a ferromagnetic material, here disclosed in the form of a clamp 202. The projection means 112 on the first part 11 is in the form of a knob means 112, e. g. of plastic. The ferromagnetic material can e. g. be steel. To connect the screen 20, pull it down and get the second fastening means 202 have contact with the first fastening means 111. The projection means 112 will keep the screen 20 in tension and prevent it from coming loose.

In FIG. 6 there is disclosed a side view of a second embodiment of the display means 1 according to the present invention. In this particular embodiment, the first fastening means 111 is made of ferromagnetic material, e. g. steel. The second fastening means 202 is in the form of a projection means 202 of a magnetic material. The projection means 112 on the first part 11 is in the form of a knob means 112, e. g., of plastic.

In FIG. 7 there is disclosed a side view of a third embodiment of the display means 1 according to the present invention. In this particular embodiment, the first fastening means 111 is in the form of a magnetic means 111 in line with the long side 404. Furthermore, the second fastening means 202 is in the form of a projection means 202 of a ferromagnetic material, e. g., steel. In FIG. 7 the projection means 202 is disclosed in the form of a clamp 202. As is apparent in FIG. 7, the projection means 112 is in the form of a projection rim 112 extending along an edge of the long side 404.

In FIG. 8 there is disclosed a perspective view of an alternative solution to the one illustrated in FIG. 2. In this particular embodiment, the pole means 12 is spring biased by an internal spring 123 arranged at the first end 121 of the pole means 12. This makes the securing of the screen 20 resilient. This is illustrated by the arrow disclosed in FIG. 8.

Figure 9:
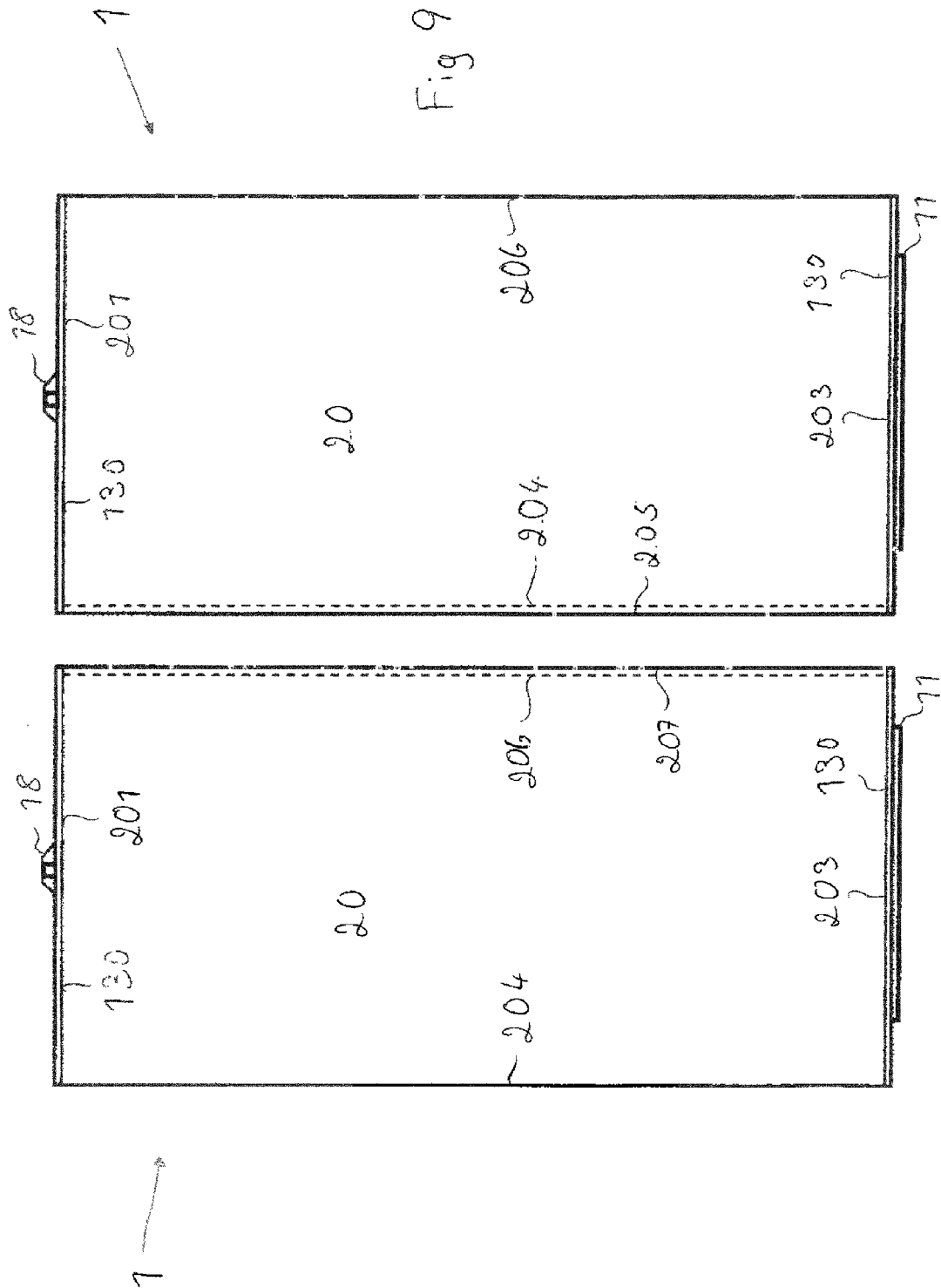
FIG. 9 discloses a side view of the assembling of a display system according to the present invention.

In FIG. 9 there is disclosed a side view of a display system 100 according to the present invention, when the display system 100 is going to be assembled. In this particular example, two display means 1 are going to be assembled. As is apparent in FIG. 9, the first magnetic strip means 204 of the first display means 1, the one to the right, is placed in order to be connected to the second magnetic strip means 206 of the second display means 1, the one to the left. Furthermore, each screen 20 also comprises two essentially hollow, straight members 130 of a rigid material, e. g., aluminum. As is apparent in FIG. 9, one member 130 is arranged in connection with the first short end 201 of the screen 20, and the other member 130 is arranged in connection with the second end 203 of the screen 20. The members 130 can comprise male and female parts operable to be connectable to each other. See e. g. the description in connection to FIGS. 12-14.

Figure 10:
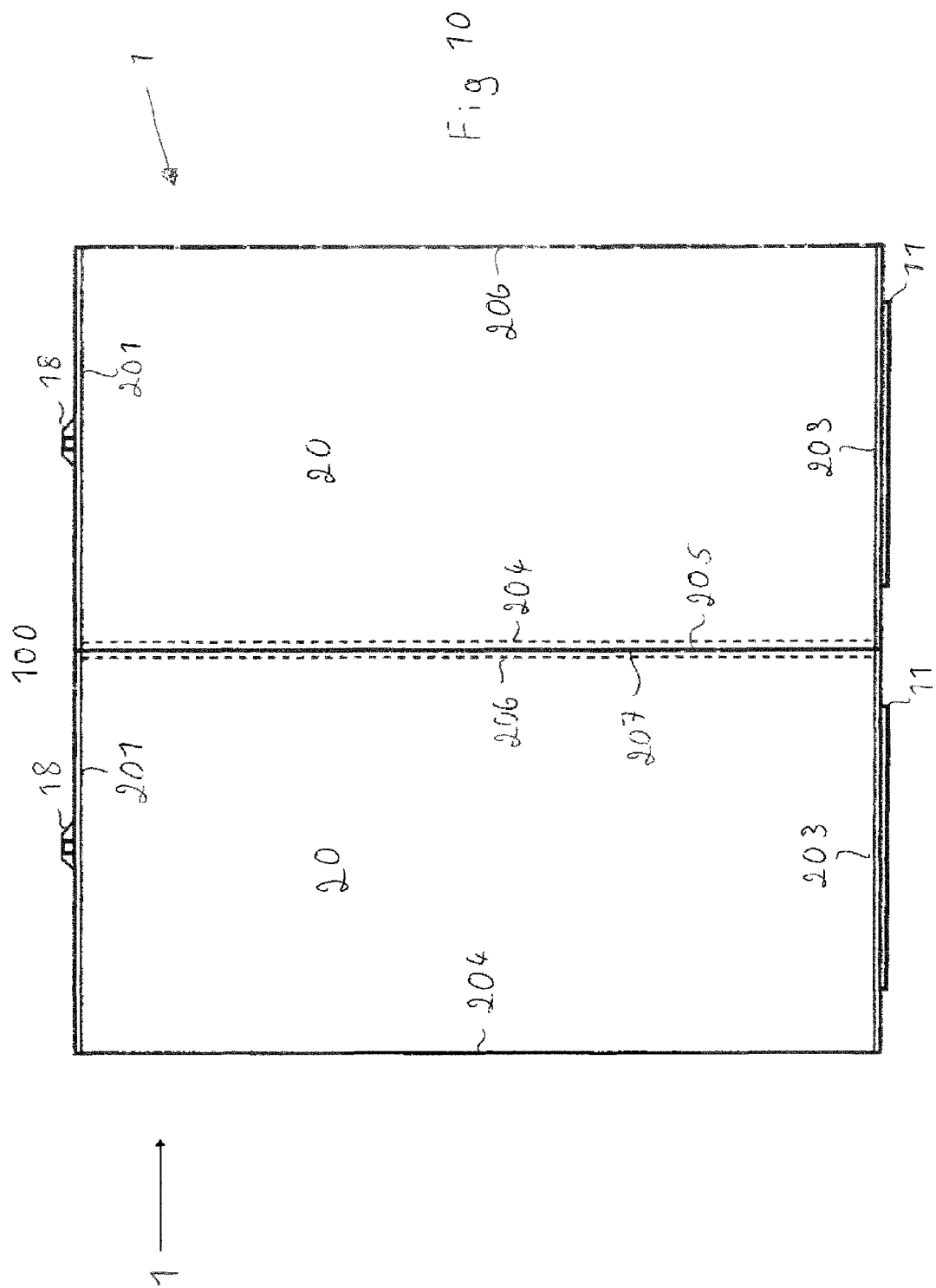
FIG. 10 discloses a side view of the display system disclosed in FIG. 9, when it has been assembled.

In FIG. 10 there is disclosed a side view of the display system 100 disclosed in FIG. 9, when it has been assembled. In this case the first magnetic strip means 204 is attracted to the second magnetic strip means 206. Furthermore, the members 130 can also be connected to each other.

Figure 11:
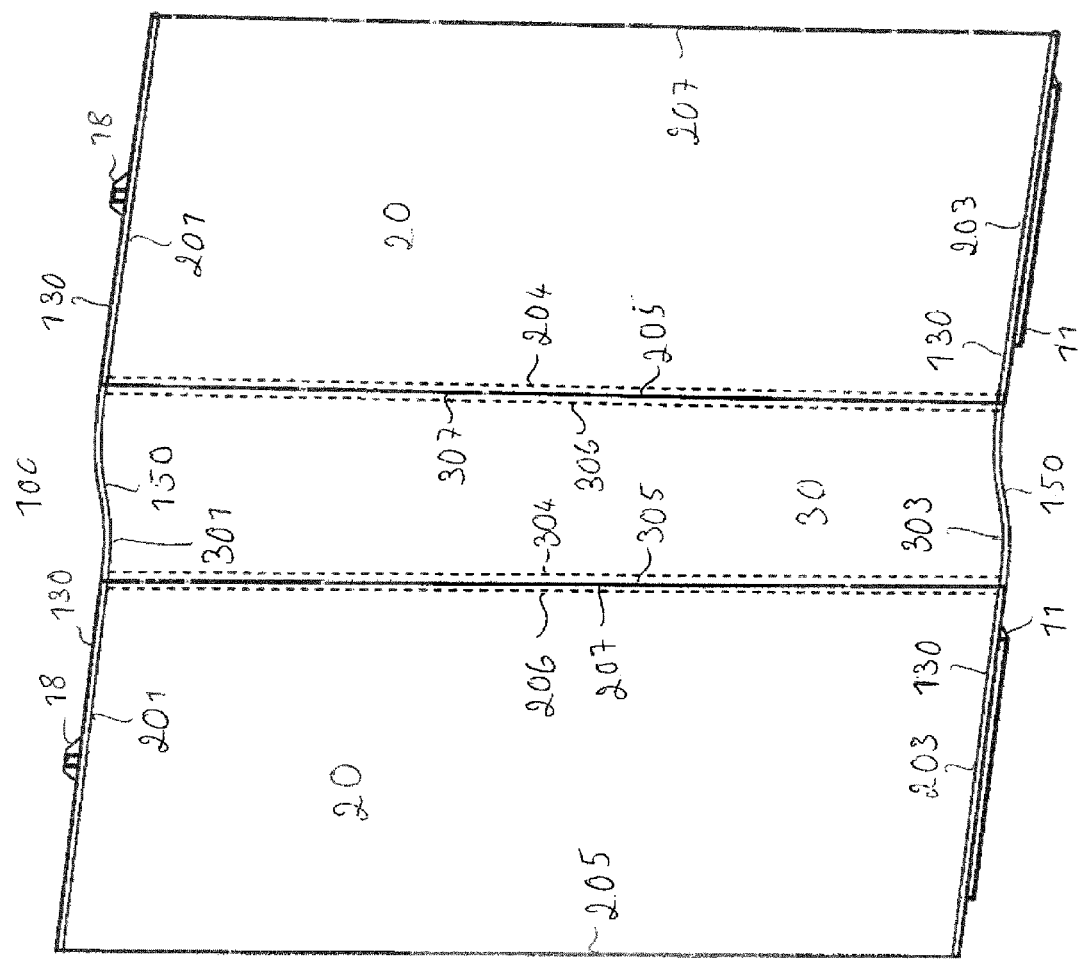
FIG. 11 discloses a side view of another display system according to the present invention.

In FIG. 11 there is disclosed another display system 100 according to the present invention, illustrating a further building element, in the form of an essentially rectangular second screen 30. The second screen 30 comprises a first magnetic strip means 304 arranged in connection with a first longitudinal end 305 of the screen 30, and a second magnetic strip means 306 arranged in connection with a second longitudinal end 307 of the screen 30. Furthermore, the second screen 30 also comprises two essentially hollow, bendable members 150 of a flexible material, e. g., of rubber. The bendable members 150 are arranged in connection with the short ends 301, and 303 of the screen 30. The end parts, not disclosed in this figure, of the members 130, 150 comprise either a male part, or a female part, at least one of them of a magnetic material. See a more detailed description in connection to FIGS. 12-14. As is apparent in FIG. 11, the second screen 30 is connected between two display means 1 by the members 130, 150 being connected to each other, and the magnetic strip means 204, 306, 206, 304 being connected to each other.

Figure 12:
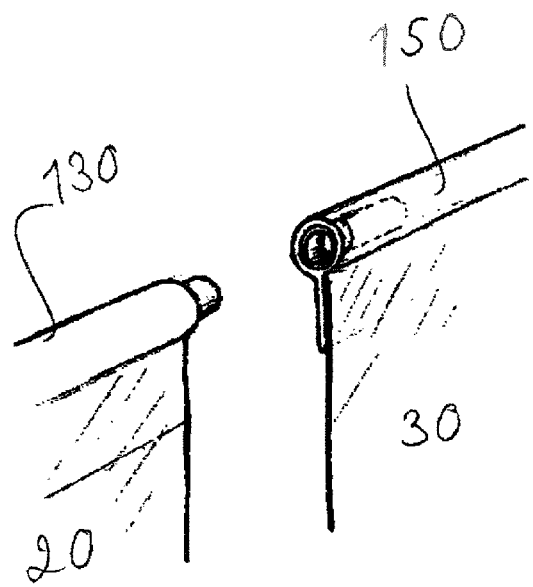
FIG. 12 discloses a perspective view in more detail of some parts of the display system disclosed in FIG. 11.
Figure 13:
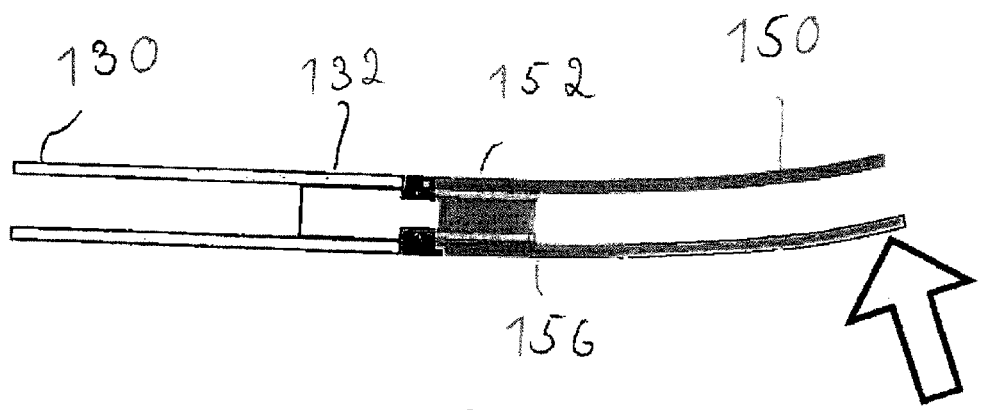
FIG. 13 is a cross section view of the parts disclosed in FIG. 12 when they have been connected.

In FIGS. 12, and 13 there is disclosed a perspective view and a cross section view of some parts of the display system 100 disclosed in FIG. 11. In FIG. 12 there is disclosed a first screen 20 with a straight member 130, and a second screen 30 with a bendable member 150. Each member 130 comprises a first end part 132, and a second end part 134 (not disclosed in FIGS. 12 and 13). Each member 150 comprises a first end part 152, and a second end part 154 (not disclosed in FIGS. 12 and 13). In this particular embodiment, the first end part 132 comprises a male part of a ferromagnetic material, e. g., steel. The first end part 152 of the bendable member 150 comprises a female part of a magnetic material. Furthermore, as is apparent in FIG. 13, the first end part 152 also comprises a sleeve means 156 arranged between the first end part 152, and the female part. This makes the connection more strength.

Figure 14:
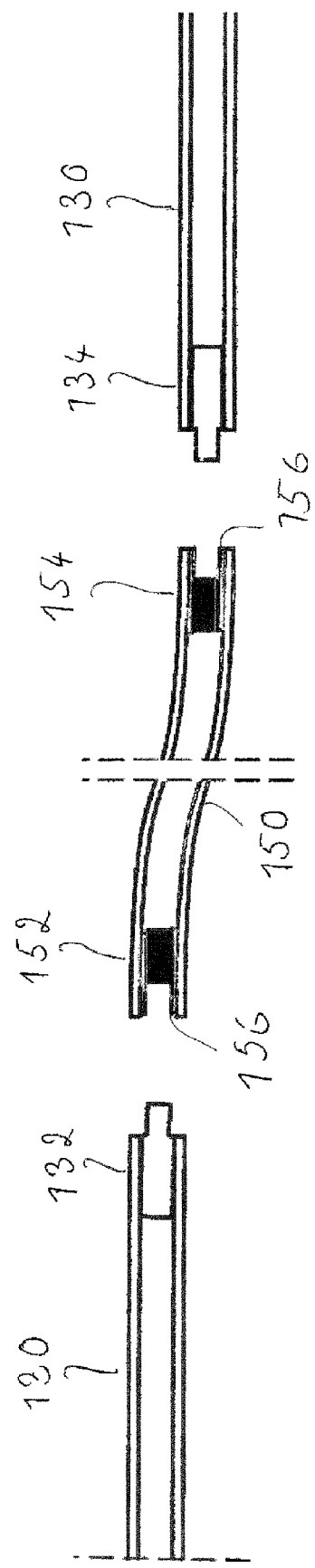
FIG. 14 is a cross section view of some parts involved in assembling the display system disclosed in FIG. 11.

In FIG. 14 there is disclosed a cross section view of some parts involved in assembling the display system 100 disclosed in FIG. 11. Here is disclosed two straight members 130, and one bendable member 150. In this particular embodiment, both the first and second end parts 152, 154 of the bendable member 150 comprise a female part of a magnetic material. To be connected to the bendable member 150 is on the one hand the straight member 130 with a male part of a ferromagnetic material arranged in the second end part 134, and on the other hand the straight member 130 with a male part of a ferromagnetic material arranged in the first part 132.

It is pointed out that the disclosed connections of different members 130, 150 are only exemplary, and not exhaustive. The different members 130, 150 can have two male parts, two female parts, or some mix of them. Furthermore, a male part can be either of magnetic or ferromagnetic material. The same applies for a female part. It is also possible to have magnetic materials of different polarity for a male part, and a female part intended to be connected.

The invention is not limited to the described embodiments. It will be evident for those skilled in the art that many different modifications are feasible within the scope of the following Claims.

The invention claimed is:

1. A collapsible display device comprising:
an essentially rectangular screen operable to be assembled to and disassembled from the display device and having an image that appears thereon; and
a stand comprising:
a first part having a front surface and a bottom surface which supports against an underlying supportive surface on which the collapsible display device stands, wherein the front surface of the first part comprises at least one first fastener and at least one projection extending outwardly from the front surface, and
a pole having a first end removably secured in said first part and a second end comprising a first coupling configured to cooperate with a second coupling arranged at a first short end of said screen in order to secure said screen resilient,
wherein said at least one first fastener is/are arranged at a shorter distance to said supportive surface than said at least one projection, wherein said screen also comprises at least one second fastener arranged at a second short end of said screen, wherein said at least one first fastener or said at least one second fastener comprises a magnet and said at least one first fastener and said at least one second fastener are configured to be magnetically fastened to each other,
wherein said screen also comprises a first magnetic strip arranged in connection with a first longitudinal end of said screen, and a second magnetic strip arranged at a second longitudinal end of said screen, and wherein said first coupling is spring biased to force said screen away from said supportive surface and to make the securing of said screen resilient.

2. The collapsible display device according to claim 1, wherein said pole is spring biased by an internal spring arranged at said first end making the securing of said screen resilient.

3. The collapsible display device according to claim 1, wherein said first coupling is in the form of a hook.

4. The collapsible display device according to claim 1, wherein said second coupling is in the form of a loop.

5. The collapsible display device according to claim 1, wherein each said first fastener is magnetic, and each said second fastener is in the form of a projection of a ferromagnetic material.

6. The collapsible display device according to claim 1, wherein each said first fastener is made of ferromagnetic material, and each said second fastener is in the form of a projection of a magnetic material.

7. The collapsible display device according to claim 1, wherein each said projection is in the form of a knob.

8. The collapsible display device according to claim 1, wherein said at least one projection is in the form of a projection rim extending along an edge of said first part.

9. A collapsible display system comprising at least two display devices, each of the display devices being the display device according to claim 1, wherein each two consecutive display devices are connected to each other by said first magnetic strip of the first display device being attracted to said second magnetic strip of the second display device.

10. The collapsible display system according to claim 9, wherein each screen also comprises two essentially hollow, straight members of a rigid material, one arranged in connection with said first short end of said screen, and the other arranged in connection with said second short end of said screen, each member comprising a first end part, and a second end part, and in that said display system also comprises an essentially rectangular second screen comprising a first magnetic strip arranged in connection with a first longitudinal end of said second screen, and a second magnetic strip arranged in connection with a second longitudinal end of said second screen, which also comprises two essentially hollow, bendable members of a flexible material, one arranged in connection with a first short end of said second screen, and the other arranged in connection with a second short end of said second screen, each member comprising a first end part, and a second end part, wherein each end part comprises either a male part, or a female part, at least one of them of a magnetic material, wherein said second screen is connected between two display device by said bendable members being connected to said straight members respectively, and said magnetic strips of said second screen being connected to said magnetic strips of the display devices respectively.

11. The collapsible display system according to claim 10, wherein an end part of a bendable member comprises a female part or a male part of a magnetic material, said end part comprises a sleeve arranged between said end part and said female part, or said male part.

* * * * *